United States Patent [19]

Berson

[11] Patent Number: 5,022,612
[45] Date of Patent: Jun. 11, 1991

[54] ELECTRO-EXPULSIVE BOOTS

[76] Inventor: Berle D. Berson, 1410 N. Grand Ave. Apt. A, Covina, Calif. 91724

[21] Appl. No.: 322,024

[22] Filed: Mar. 13, 1989

[51] Int. Cl.$^5$ ............................................ B64D 15/18
[52] U.S. Cl. .............................. 244/134 D; 244/154 A
[58] Field of Search ............ 244/134 A, 134 D, 134 R

[56] References Cited

U.S. PATENT DOCUMENTS

| | | | |
|---|---|---|---|
| 3,800,121 | 3/1974 | Dean et al. | 244/134 D |
| 3,809,341 | 5/1974 | Levin et al. | 244/134 R |
| 4,494,715 | 1/1985 | Weisend, Jr. | 244/134 A |
| 4,690,353 | 9/1987 | Haslim et al. | 244/134 D |

Primary Examiner—Deborah L. Kyle
Assistant Examiner—Richard W. Wendtland
Attorney, Agent, or Firm—L. A. Germain

[57] ABSTRACT

An electro-expulsive boot comprises two peripherally-interconnected and juxtaposed elastomeric members and an electrically-conductive element helically and/or spirally wound between the two members and embedded in the elastomeric material which comprises the members and an electrical current pulse applied to the conductive element generates a force in one member which opposes a force generated in the other member and the members are expulsively separated by the existence of the current pulse.

6 Claims, 2 Drawing Sheets

ELECTRO-EXPULSIVE BOOTS

BACKGROUND OF THE INVENTION

This invention generally pertains to apparatus for generating an impulse mechanical force as between two members using electrical input energy. More particularly, the invention provides a configuration for an elastomeric composite boot comprised of two interconnected juxtaposed elastomeric members, each member including a plurality of serially-connected electrical conductors embedded within the composite forming the boot members. The electrical conductors are of such configuration and orientation within the boot as to effectively generate a very high proximal mechanical force as between the two juxtaposed members. The force effects an impulse separation of one member from the other when an electrical impulse current is applied to the conductors. The generated electro-expulsive force is useful in many and various applications where an impulse mechanical motion is desired.

A particular application which benefits from an impulse mechanical force pertains to aircraft deicing of critical surface areas. Aircraft icing problems are generally associated with airfoil, rotor blade, and engine inlet leading edge surfaces. U.S. Pat. No. 4,690,353 to Leonard A. Haslim and Robert D. Lee and assigned to the United States of America as represented by the Administrator of the National Aeronautics and Space Administration traces the history of attempts to solve the aircraft icing problem. This patent describes an electro-expulsive system which also attempts to address the aircraft icing problem. According to this patent, two flexible ribbon-type electrical conductors are mounted in very close proximity to each other within respective upper and lower elastomeric members and an electrical impulse current applied to the conductors results in opposing fields which interact in such a manner as to force a separation of the two members. The generated force F(1) for a single conductor configuration is given in the patent as:

$$F = 4\Pi a^{-1}[\tan^{-1}ab^{-1} - \tfrac{1}{2}ba^{-1} \ln(1+a^2b^{-2}) \times 10^{-7} N/m$$

where
F is the force per unit length,
I is the current in one conductor in a first direction,
I' is the current in the other conductor in an opposite direction
"a" is the width of the conductors, and
"b" is the distance separating the parallel conductor segments. Obviously, the force "F" may be increased by increasing the current.

The above-referenced patent cites an example wherein a force $F = 2430 lbs/ft$ ($35.5 \times 10^3$ N/m) may be obtained when the two electrical ribbon conductors each have a width of 0.300 inches (7.62 mm), are separated by a gap of 0.079 inches (2.0 mm), and an electrical current of 3000 amperes is applied.

The present applicant, in attempting to fabricate a deicing boot for a jet aircraft engine inlet, could not obtain the results cited in the U.S. Pat. No. 4,690,353. Experiments conducted on a boot made in accordance with the teachings of the cited patent were marginal in generating enough force which would break up ice on the boot surfaces. It seemed apparent that very little of the available electrical input energy was being converted efficiently to mechanical energy sufficient to displace the members comprising the boot structure. Only substantial increases in the current would improve the performance.

In view of these failures, the teachings of the above-cited prior art patent were more closely scrutinized. Upon applying the specific data for the example of an electro-expulsive boot to the given force equation, it was found that only slightly over 450 N/m could be obtained from the calculations. This is in contrast to a stated force of $35.5 \times 10^3$ N/m. This discrepancy resides in the fact that the radian term in the arc-tangent function was inappropriately evaluated in the patent calculations.

The serpentine conductor configuration taught in the above-cited patent was also more critically assessed and it was determined that it was questionable whether such configuration could produce sufficient energy conversion efficiency to generate the high mechanical force necessary in a deicing application. This assessment was taken from the fact that, while a pair of vertically positioned and separated ribbon conductors generated a repelling force between themselves when their respective currents are in opposite directions, there are other pairs of contiguous ribbon conductors in the immediate proximity to the first pair which have currents which generate attractive forces between opposing members of adjacent pairs. In this circumstance and before any useful electro-expulsive force is generated, the attractive forces which exist must be overcome. This is obviously an inefficient energy conversion configuration.

Upon re-thinking the physical phenomena as applied to electro-expulsive boots, the applicant determined that an improvement in mechanical output force may be possible by serially connecting multiple conductors so that the same available current flowed in the same direction through contiguously-positioned conductors. In this way the generated field which exists between any two conductors in the same boot member will be additive. When the upper and lower members of a boot structure each contain multiple conductors, the overall opposing fields which are generated in the boot members greatly increases the mechanical output force. Accordingly, the force equation for this configuration was determined to be N-squared times the force F(1) for a single turn configuration i.e., $F(N) = N^2 \times F(1)$ where (N), N and (I) denote the number of turns. From this it becomes apparent that, for the same applied current, the force is also dependent upon the square of the number of conductors rather than just the available current as taught by the prior art.

In accordance with the above realization, an experimental boot was fabricated using multiple turns of #14 magnetic wire conductors. The conductors were laid up in a serial arrangement such that ten turns of wire were evident in each of the upper and lower boot members. Upon application of an electrical impulse current, sufficient mechanical output force was generated to propel a fourteen inch long 2×4 board approximately five feet in the vertical direction. This result was obviously a remarkable advancement over a state of the art boot which could only propel a few coins a couple of inches upwards!

It will be appreciated that, subsequent to prototype testing, analytical development of the dynamic equations of the above-described system revealed why implementing a multi-turn boot configuration has a beneficial effect. Not only are the forces on the conductive elements increased with an increase in the number of conductor turns, but, in addition, the electrical-mechanical conversion efficiency is enhanced. By application of a multi-turn conductor configuration, the variable (N) for the number of conductor turns can be used to optimize the conversion efficiency. Further, it can be shown that the separation distance between upper and lower boot members is not significant when the ratio of the boot area to the upper-lower member separation is reasonably large. In other words, the forces and pressures generated are independent of the separation dimension and these will not vary as the separation between the two conductors is varied. This is remarkable in view of the prior art which teaches otherwise. Furthermore, this is very significant in a multi-turn electro-expulsive boot in accordance with the present invention as it allows for vertical stacking of electrical conductors without losing output force due to any separation constraint imposed on the boot structure.

SUMMARY OF THE INVENTION

In light of the foregoing, the various aspects and advantages of the invention, which will become apparent as the detailed description proceeds, are achieved in an electro-expulsive boot comprising in combination:
an elastomeric ply which defines a first member;
an elastomeric ply which defines a second member in juxtaposition with respect to the first member and both members have interconnected peripheral edges to enclose a space separating the two members;
a release membrane within the space between the two members to maintain the separate integrity of each of the members; and
an electrically-conductive element embedded within the elastomeric material comprising each of the members, the element oriented such as to pass from the first member, through the peripheral edge between the members, and into the second member in a substantially continuous manner between the members such that a plurality of contiguous segments of the electrically-conductive element are evident within each of the members and the application of a particular magnitude electrical current pulse generates an electromagnetic force in the first member which opposes an electromagnetic force in the second member and the two members are impulsively separated by the opposing forces.

BRIEF DESCRIPTION OF THE DRAWINGS

The invention and various aspects and advantages thereof will be better understood and appreciated when consideration is given to the following detailed description and the accompanying drawings wherein in the several figures like-reference numerals indicate like elements and wherein.

DETAILED DESCRIPTION OF THE INVENTION

Figure 1:
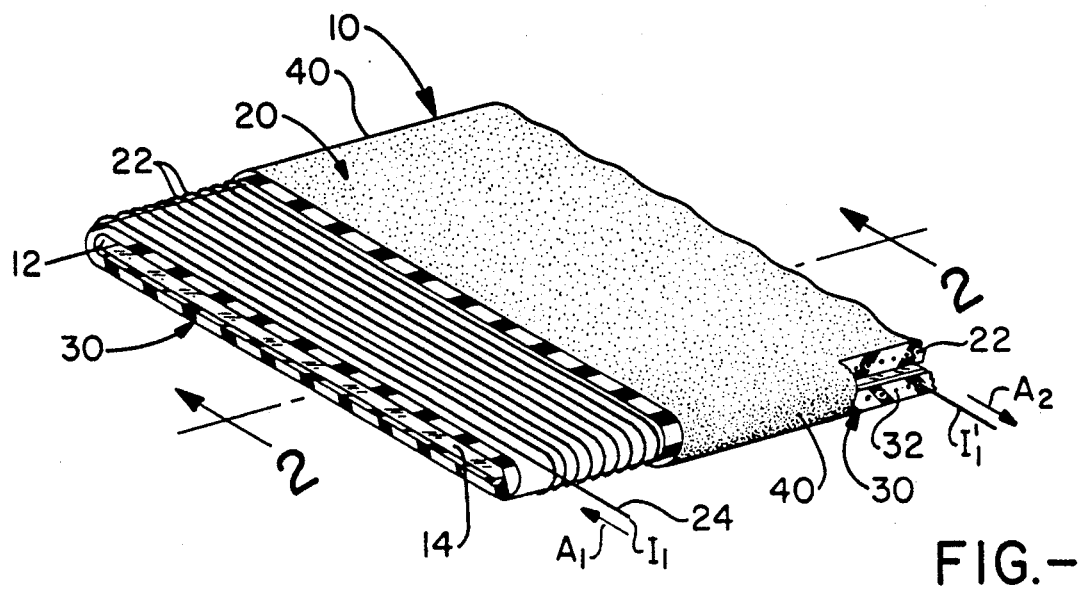
FIG. 1 is a perspective view, partially broken away and in cross section, illustrating a first embodiment of an electro-expulsive boot in accordance with the invention.
Figure 2:
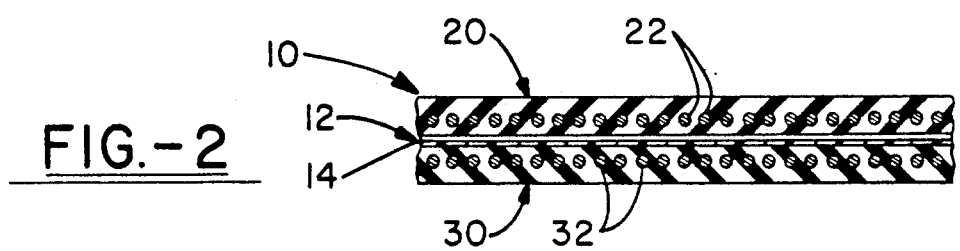
FIG. 2 is an enlarged elevational view, in cross section, of the boot shown in FIG. 1 as may be taken on line 2—2 thereof.
Figure 3:
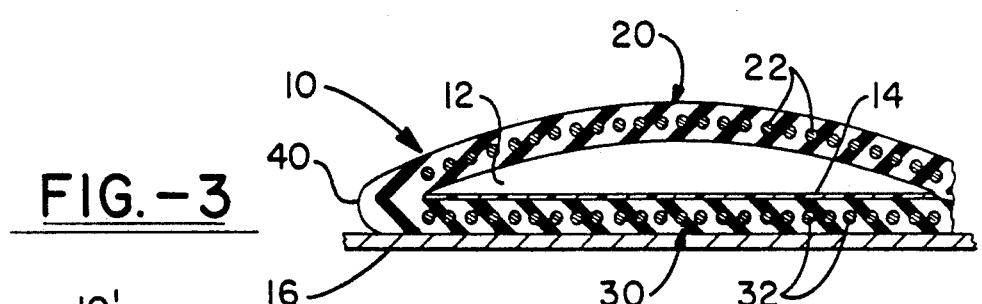
FIG. 3 is an elevational view, in cross section, of the boot upon the application of an impulse electrical current.

Referring to the drawings, FIGS. 1-3 illustrate a basic construction of an electro-expulsive boot in accordance with the present invention. The boot is generally indicated by reference numeral 10 and comprises juxtaposed elastomeric members 20 and 30 respectively. The members 20 and 30 are attached or otherwise interconnected about their peripheral edges 40 to enclose a space generally indicated at 12. Because of the elastomeric nature of the boot 10, the spacial separation 12 between the two members 20,30 is accomplished and maintained by a release membrane 14 which may comprise any of the known materials useful for this purpose. Of course, such release membrane may also aid in the process of manufacturing the boot 10 as well understood by those persons knowledgeable in the elastomer arts. In any event, the separate integrity of the two members 20,30 is required in the operation of the boot. Elastomeric member 20 is shown and may be considered to be an upper member of the boot 10 while elastomeric member 30 is shown and may be considered to be a lower member, however, the specific orientation of the members is not a critical factor except that at least one of the members should be affixed to a relatively stationary substrate material 16 in the normal operation of the boot 10.

The elastomeric members 20 and 30 are characterized by having a plurality of electrically-conductive elements embedded within the elastomer which comprises each member. The conductive elements in member 20 are indicated by reference numeral 22 while the conductive elements in member 30 are indicated by reference numeral 32. While the conductors 22,32 are indicated by separate reference numerals, it should be understood that they comprise a single electrical conductor which is wound from one member 20 to the other member 30 such that an electrical current passing into the conductive elements will be the same current in all of the elements. For example, a current $I_1$ at an input conductor 24 has a direction indicated by arrow $A_1$ and all of the conductor segments 22 in the member 20 will have a current flowing in the direction of arrow $A_1$. However, when the current $I_1$ moves from member 20 through the peripheral edge 40 to member 30, its direction will be in accordance with arrow $A_2$. This current is distinguished by $I'_1$. Thus, because of the orientation of the electrical conductor, the current direction in all of the conductor segments 22 will be in the same direction of arrow $A_1$ while the current direction in all of the conductor segments 32 will be in the same direction of arrow $A_2$.

From the above description of boot 10, it can be appreciated that a current $I_1$ in the conductive elements 22 will generate an electromagnetic force field which is additive between contiguous conductors. By the same token, current $I'_1$ in the conductive elements 32 will generate an electromagnetic force field which will be additive as between contiguous conductors. In this respect and because of the reverse direction of the currents $I_1$ and $I_1'$, the fields which exist and interact between the two sets of conductors 22,32 is a repelling electro-expulsive force which results in a separation of the members 20 and 30. When the current is a high amplitude pulse, the upper member 20 will be expulsively separated from the member 30 which is held relatively stationary by its mounting arrangement on a substrate 16. FIG. 3 illustrates the condition of the boot 10 at a particular instant in time upon the application of a pulse current to the electrically-conductive elements 22,32.

Figure 4:
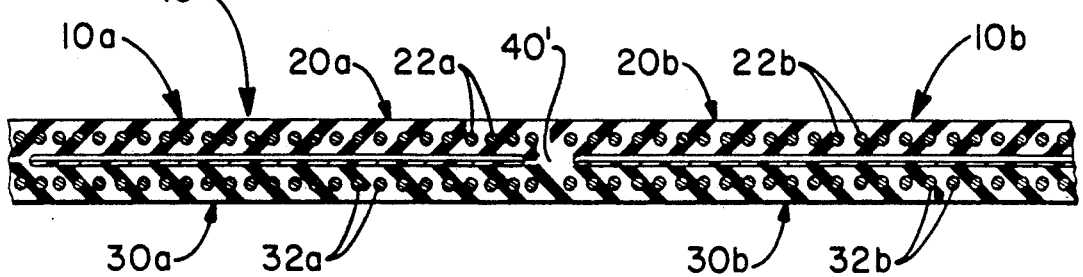
FIG. 4 is an elevational view, in cross section, illustrating a multiple boot configuration of the boot structure shown in FIG. 1.
Figure 5:
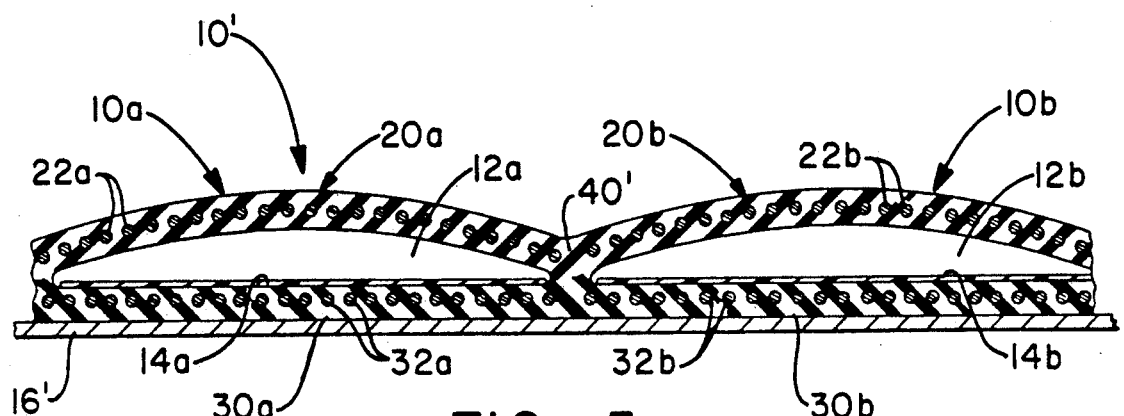
FIG. 5 is an elevational view, in cross section, of the multiple boot configuration shown in FIG. 4 upon the application of an impulse electrical current.

FIGS. 4 and 5 illustrate an electro-expulsive boot 10' which comprises multiple individual boots 10a, 10b, 10c ... etc. The multiple boots have electrically-conductive elements indicated at 22a, 32a, 22b, 32b ... etc. and these may all comprise a single conductor or alternatively may comprise multiple individual conductors in each of the boot members 10a, 10b ... etc.

Figure 6:
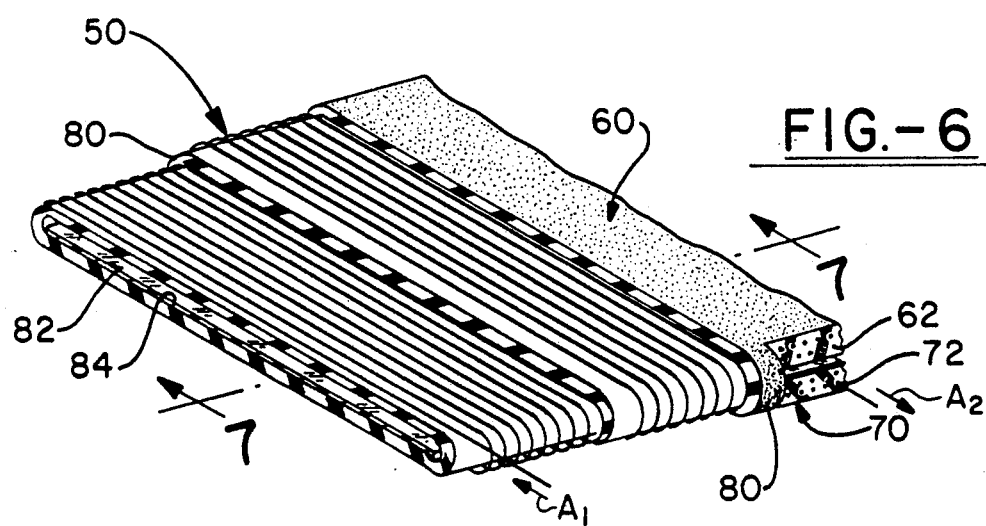
FIG. 6 is a perspective view, partially broken away and in cross section, of a second embodiment for an electro-expulsive boot in accordance with the present invention.
Figure 7:
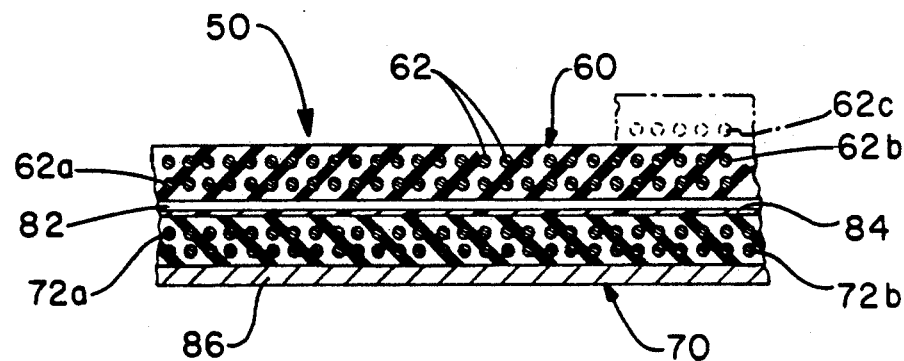
FIG. 7 is an elevational view, in cross section, of the boot shown in FIG. 6 as may be taken on line 7—7 thereof.

FIGS. 6 and 7 illustrate an electro-expulsive boot configuration generally indicated by reference numeral 50, which boot comprises upper and lower elastomeric members 60 and 70 respectively. The members 60,70 are interconnected about peripheral edges 80 to enclose a space 82 which may include a release membrane 84. The boot 50 is particularly characterized by a plurality of vertically-oriented, electrically-conductive elements, one group of conductor element segments in the upper member 60 indicated by reference numeral 62 while a second group of conductor element segments in the lower member 70 are indicated by reference numeral 72. All of the electrically-conductive segments comprise a single conductor element which is wound between the two members 60,70 and layered vertically as clearly illustrated in FIG. 7. For example, a conductive segment 62a is wound through the peripheral edge 82 and continues in the lower member 70 as conductive segment 72a. All of the conductive segments 62a comprise a first ply of elements in the member 60 while all of the conductive segments 72a comprise a first ply of elements in the member 70. The last element 70a in the ply is then passed through the edge 82 to start the second ply of conductive segments 62b in the member 60 and the conductive segments 62b,72b comprise a continuance of the wound conductor. Additional vertical plys 62c,72c ... etc. may be wound as illustrated in FIG. 7.

From the foregoing description it will be recognized that an impulse current applied to the conductive segments 62 of member 60 will be in the same direction of arrow $A_1$ and any generated field due to the current in contiguous conductive segments will be additive and reinforced within the member 60. By the same token, when the current exists in the conductive segments 72 in the member 70, the direction of the current will be in the opposite direction and in accordance with arrow $A_2$ and any generated field due to the current in contiguous conductive segments will be additive and reinforced within the member 70. The generated force fields as between the two members 60,70 will be in opposite directions and therefore will be repulsive. In this circumstance, when the member 70 is relatively stationary, i.e., affixed to a substrate 86, the member 60 will be expulsively moved away from the member 70.

It will, of course, be recognized by those skilled in the art that the orientation of the electrically-conductive elements may be either helically or spirally wound within the boot structure to accomplish the results of the invention. In a single level electro-expulsive boot as illustrated in FIGS. 1–5 the electrical conductor is helically wound along the lineal length of the boot whereas in the embodiment illustrated in FIGS. 6 and 7 the conductor may be either helically wound through each additional vertically-stacked level or, alternatively, spirally wound along the length to accomplish a multi-level orientation of the conductor. In view of this, the invention is not considered limited in any way to the manner of helically and/or spirally winding of the electrically-conductive elements.

From the foregoing description it will be recognized that the present invention provides an electro-expulsive boot configuration which may be applied to many applications wherein an output mechanical force is desired and which output force is controllable by an electrical input signal. Besides its obvious application to many deicing requirements, the electro-expulsive boot of the present invention may be useful in missile launching applications which now use explosive devices. Further, the invention may be readily adapted to space applications wherein it is desirous to expel various type payloads from a spacecraft.

While in accordance with the statute certain representative embodiments and details have been shown or described in detail for the purpose of illustrating the invention, it will be apparent to those skilled in the art that various changes and modifications may be made therein without departing from the spirit or scope of the invention.

What is claimed is:

1. An elastomeric boot to convert electrical input energy to a mechanical output force comprising in combination:

an elastomeric ply which defines a first member;

an elastomeric ply which defines a second member in juxtaposition with respect to the first member and both members have interconnected peripheral edges to enclose a space which separates the two members;

a release membrane within the space between the two members to maintain the separate integrity of each of the members; and an electrically-conductive wire embedded within the elastomeric material comprising each of the members, said wire oriented such as to pass helically from the first member, through the peripheral edge between the members, and into the second member in a continuous manner between the two members such that multiple contiguous segments of the electrically-conductive wire are evident within each of the members wherein the application of a particular magnitude electrical current pulse to the conductive wire generates an electromagnetic force which is in a first direction and additive between contiguous conductor segments within the first member and the same current generates an electromagnetic force which is in a second direction and additive between contiguous conductor segments within the second member, said opposing forces effecting an electro-expulsive separation between the two members in accordance with the existence of the current pulse.

2. A boot as set forth in claim 1 wherein the electrically-conductive wire is helically wound between the first and second members and at least one additional vertically-spaced ply of the electrically-conductive wire is evident within each member and an electrical current applied to the conductive wire has the same electrical direction in all contiguous portions of the conductive wire in a member and the current direction as between the members is opposing.

3. A boot as set forth in claim 1 wherein the electrically-conductive wire is helically wound between the first and second elastomeric members and multiple plies of vertically-stacked, spirally wound conductive wires are evident in each of the members and all contiguous portions of the conductive wire in a member carry a current in the same direction and the current direction as between the members is opposing.

4. A boot as set forth in claim 1 wherein one of the elastomeric members is affixed to a relatively stationary surface and the application of an electrical current pulse to the electrically-conductive element generates a force between the two members which expulsively separates the two members effective to expel any ice accumulation which may exist on the surface of the member which is not affixed.

5. An apparatus for deicing a surface comprises in combination:

an elastomeric ply which defines a first member affixed to the surface to be deiced;

an elastomeric ply which defines a second member in juxtaposition with respect to the first member and both members have interconnected peripheral edges to define an elastomeric boot enclosing a space which separates the two members;

a release membrane within the space between the two members to maintain the separate integrity of each of the members; and an electrically-conductive wire embedded within the elastomeric material comprising each of the members, said wire wound and oriented such as to pass from the first member, through the peripheral edge between the members and into the second member in a continuous helical manner between the two members such that multiple contiguous segments of the electrically-conductive wire are evident within each of the members and the application of a particular magnitude electrical current pulse to the conductive wire generates an electromagnetic force which is in a first direction and additive between contiguous conductor segments within the first member and the same current generates an electromagnetic force which is in a second direction and additive between contiguous conductor segments within the second member, said opposing forces effecting an electro-expulsive separation between the two members in accordance with the existence of the current pulse.

6. A deicing boot as set forth in claim 5 wherein the electrically-conductive wire is helically and spirally wound between the two members and at least one additional vertically-spaced ply of the conductive wire is evident within each of the members.

* * * * *